: 2,813,911
Patented Nov. 19, 1957

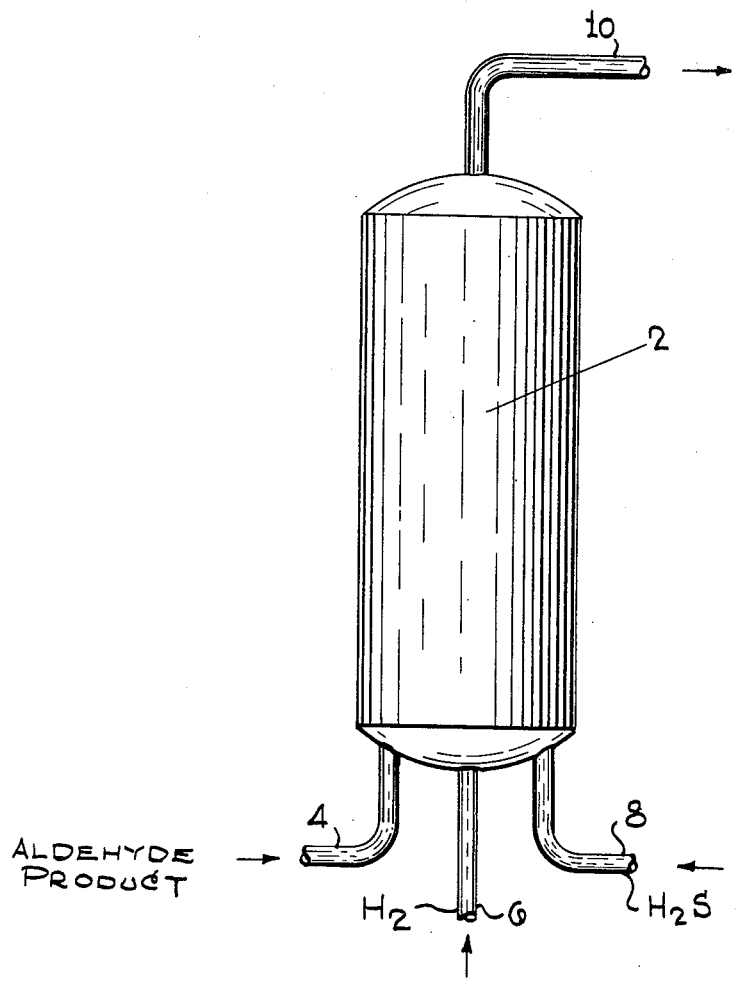

2,813,911

SULFACTIVE ALDEHYDE HYDROGENATION CATALYST

Ralph B. Mason and Edward W. S. Nicholson, Baton Rouge, La., assignors to Esso Research and Engineering Company, a corporation of Delaware Application August 21, 1953, Serial No. 375,591

3 Claims. (Cl. 260—638)

The present invention relates to the preparation of oxygenated organic compounds by the reaction of carbon monoxide and hydrogen with carbon compounds containing olefinic linkages in the presence of carbonylation catalysts. More specifically, the present invention relates to the preparation of alcohols of a high degree of purity suitable for the preparation of colorless plasticizing agents from the aldehydes formed in the first stage of the process. Still more particularly, the present invention relates to an improved process for preparing the sulfur-insensitive hydrogenation catalyst to increase its activity and decrease the extent of contaminants and impurities in the resulting alcohol product.

The synthesis of oxygenated organic compounds from olefinic compounds and mixtures of CO and $H_2$ in the presence of a catalyst containing metals of the iron group, particularly cobalt, is now well known. In the first stage, the olefinic material, catalyst, and CO and $H_2$ are reacted at superatmospheric pressures to give a product consisting essentially of aldehydes containing one more carbon atom than the reacted olefin. This oxygenated organic mixture, which contains in solution salts and carbonyls of the catalyst, i. e. cobalt carbonyl, is treated in a catalyst removal zone at elevated temperatures to cause removal of the metal carbonyls. The catalyst-free material is then hydrogenated to the corresponding alcohol, and it is to this stage that the present invention applies.

This carbonylation reaction provides a particularly attractive method for preparting valuable primary alcohols, particularly those which are intermediates for plasticizers and detergents. Amenable to the reaction are substantially all types of organic compounds, substituted or not, which contain olefinic unsaturation.

The catalyst for the first stage of the reaction, where olefinic material is converted into aldehyde, is usually added in the form of salts of the catalytically active metal with high molecular weight organic acids, such as oleic, stearic, naphthenic, etc. Examples of such catalyst salts or soaps are cobalt stearate, naphthenate and the like. These salts are soluble in the liquid olefin or olefin-paraffin feed, and may be supplied to the first stage dissolved in the feed or as hydrocarbon solution.

As the synthesis gases are consumed at equivalent or equimolar rates, synthesis gas components are usually added at equimolar proportions of $H_2$ and CO, though it has been suggested to use both an excess of hydrogen and an excess of CO. The conditions for reacting olefinic compounds with hydrogen and carbon monoxide vary somewhat in accordance with the nature of the olefinic feed, but the reaction is generally conducted at pressures of about 3000 pounds per sq. in. and at temperatures in the range of about 200–450° F. The ratio of synthesis gas feed to olefin may vary widely; in general, about 1000 to 15,000 cu. ft. of $H_2+CO$ per barrel olefin feed are employed.

Following the carbonylation stage, the aldehyde product containing in solution a considerable amount of dissolved catalyst in the form of carbonyls, is treated at elevated temperatures in the presence of a gas, vapor, or liquid to decompose the carbonyl to an oil-insoluble form of the metal. Thereafter, the aldehyde product is freed of suspended catalyst, and is passed to a hydrogenation zone for conversion into alcohols.

The hydrogenation stage may be operated at conditions including temperatures and pressures and feed rates of the same order of magnitude as those obtaining in the carbonylation stage. Various types of catalysts may be employed in the reaction. However, serious difficulties have been encountered in the hydrogenation catalyst, when sulfur-sensitive catalysts, such as nickel and the like are employed in this service. The most readily available olefinic feed stocks are selected hydrocarbon streams derived from petroleum sources, and these frequently have sulfur contents of 0.1% and even higher. Similarly, the synthesis gases employed in the carbonylation zone are frequently contaminated with minor amounts of sulfur impurities.

Appreciable sulfur which is present in the crude reaction mixture containing the carbonyl compounds is carried through the oxonation and carbonylation stage into the hydrogenation stage, where it combines with the hydrogenation catalyst, if the latter is sulfur-sensitive, to reduce and destroy its activity.

Extensive experimental work with sulfur-insensitive catalysts showed that the great majority either had unsatisfactory activity or alcohol selectivity, or had insufficient mechanical strength, or all of these undesirable properties. However, it was found that a catalyst consisting essentially of molybdenum sulfide supported on activated carbon combined satisfactory mechanical strength with good activity and high alcohol selectivity, and was far superior to other sulfur-insensitive hydrogenation catalysts for liquid phase hydrogenation of sulfur-contaminated aldehyde product resulting from the carbonylation reaction. The catalyst was prepared by impregnating activated char, in the form of 4–8 mesh granules, with an aqueous solution of ammonium molybdate, heated to decompose the molybdate to the corresponding oxide, $MoO_3$ and sulfided with $H_2S$ to convert the oxide to the sulfide.

Though the sulfur-insensitive catalyst thus produced has the great advantage of long life, physical strength and resistance to poisoning by carbon monoxide and sulfur, it suffers the disadvantage of permitting some sulfur to pass unchanged through the hydrogenation zone. Furthermore, it has been observed that when the catalyst is freshly sulfided, there is a pronounced tendency to introduce additional sulfur into the alcohol product. The amounts are relatively small, in the order of a few parts per million, and, in most operations, as where detergent alcohols are to be produced, would cause no difficulties. But in the case where alcohols are prepared for utilization as plasticizer intermediates, these small amounts of sulfur play an important role in degrading the product and making it unfit for use as a plasticizer. In particular, the octyl and nonyl alcohols are favored as plasticizing agents in the form of their esters, such as phthalates, adipates, maleates and the like. It is a condition precedent that for their use as plasticizers for light or colorless resins and clear plastics that they be substantially colorless.

It has been found that extremely small amounts of sulfur in the alcohol product, on the order of less than a thousandth of a percent, are sufficient to make the alcohol unfit for plasticizing purposes. Thus it has been found that where the alcohol product has a sulfur content of only 15 parts per million, i. e. 0.0015%, the phthalate esterification product was too dark for use as a plasticizing material. This darkening occurs during the recycling operation during esterification. Thus in a typical alcohol recycle esterification operation, a 1–2% molal excess of alcohol is used based on phthalic anhydride. Unreacted alcohol is stripped off from the ester product under reduced pressures and blended with fresh alcohol for recycle to the esterification zone. When more than about 10 parts per million of sulfur contaminants are present in the alcohol product, it has been found that color forming bodies build up in the recycle material during the recycle stage.

In brief, therefore, small amounts of sulfur in the alcohol product to be employed in the manufacture of plasticizing intermediates play an important role in degrading the product, resulting in an economic loss. Contamination has been traced in part to liberation of sulfur from the sulfactive molybdenum hydrogenation catalyst in the early stages of the operation. The catalyst is prepared by impregnating carbon pellets with ammonium molybdate or other hexavalent forms of molybdenum, thereafter sulfiding by heating the catalyst in a stream of $H_2$ to 200°–400° F. and then introducing a stream of nonreactive liquid, such as a light virgin naphtha, saturated with $H_2S$. The catalyst temperature is then raised to 500°–900° F. for 12–24 hours until sulfiding is complete, and $MoO_3$ converted essentially completely to the sulfide.

When the catalyst thus prepared is employed in the commercial hydrogenation of aldehydes prepared by carbonylation of $C_7$ olefins to produce octyl alcohols for use as plasticizing intermediates, it was found, in a particular operation, that the first 20,000 gallons of $C_8$ alcohols thus produced were completely unsuitable for use as plasticizing agent intermediates. The alcohol product had a sulfur content of 19 parts per million, which was found to produce an ester color of 1.05. The ester color is a measure of optical density of the ester as produced under prescribed conditions, and has been found to be affected by extremely small amounts of sulfur impurities. The wave length used in studying isooctyl phthalate ester is 4470 A. For producing a satisfactory plasticizing ester, the ester color should not be greater than about 0.1. This value is associated with product alcohol sulfur content of 10 parts per million and less.

It is, therefore, the principal object of the present invention to provide and to prepare an aldehyde hydrogenation catalyst which is insensitive to carbon monoxide and sulfur, but which will in turn have less tendency to contaminate the resulting alcohol product than sulfactive catalysts hitherto described.

It is also a purpose and object of the present invention to prepare in a novel manner a superior sulfactive aldehyde hydrogenation catalyst of high activity, which reaches a high activity level at a lower temperature than sulfactive catalysts prepared by means hitherto described in the art.

Other and further purposes, objects and advantages of the present invention will become apparent from the more detailed description hereinafter.

It has now been found that a molybdenum sulfide-on-charcoal catalyst of considerably greater stability and lesser tendency to lose sulfur initially may be prepared by sulfiding a form of molybdenum oxide wherein the molybdenum is in a lower valance state than in the hexavalent form, which it has been the practice to sulfide hitherto.

In the standard method of preparing the sulfided catalyst, as described hitherto, activated carbon pellets are impregnated with a hexavalent molybdenum salt, such as ammonium molybdate, and thereafter heated to convert the material to $MoO_3$ which is then sulfided. On heating in the presence of $H_2S$, the oxide is probably converted initially to the trisulfide which decomposes in the presence of heat to molybdenum disulfide and elementary sulfur. Also, elementary sulfur may result from the reduction of the molybdenum trioxide by the $H_2S$ during the sulfiding stage. In either case, elementary sulfur is left on the catalyst and is gradually removed by the alcohol product during the hydrogenation. This sulfur loss reaches an apparent equilibrium after about 15,000–20,000 gallons of alcohol have been produced by hydrogenation and, as pointed out, this initial alcohol product is not suitable for esterification purposes, and must be further treated or rerun, after the catalyst has come into equilibrium, because of high sulfur content and high ester color.

It has now been found that the hydrogenation catalyst may be considerably more quickly and efficiently sulfided, and the amount of off-test alcohol produced in the initial stages of the hydrogenation reaction be appreciably lessened, by reducing the valence of the molybdenum on the catalyst from the hexavalent form to an intermediate state before sulfiding. This is done by heating the catalyst after impregnation to about 200° to 350° F., to decompose the ammonium molybdate to molybdenum trioxide, $MoO_3$. Thereafter, a stream of hydrogen is introduced at a temperature of about 600° to 1000° F., at a pressure of 200–3000 p. s. i. g. for a sufficient period of time to reduce $MoO_3$ to $MoO_2$, $MoO$, or a mixture of the lower oxides. The sulfided catalyst, whether prepared from the higher or lower oxides of molybdenum, consists for the most part of $MoS_2$, i. e. the molybdenum is in the quadrivalent state. But when the molybdenum is reduced to the quadrivalent state, or lower, prior to sulfiding, as in accordance with the present invention, the oxidation of hydrogen sulfide to elementary sulfur is avoided.

When the desired amount of reduction has been accomplished, the catalyst bed is cooled to about 300° F., and $H_2S$ is introduced into the bed, either as a gas or dissolved in an inert liquid, such as Varsol or virgin naphtha. Gas is passed until sulfiding is complete. Because of the prereduction of the catalyst, a shorter time and less $H_2S$ are required than when $MoO_3$ is sulfided.

The present invention and its application will best be understood from the more detailed description hereinafter, wherein reference will be made to the accompanying drawing, which is a schematic representation of a system suitable for carrying out a preferred embodiment of the invention. As the latter resides in the hydrogenation rather than in the carbonylation or finishing stages, only the first mentioned step is shown in the drawing.

Referring now to the drawing, liquid aldehyde product substantially free of dissolved cobalt, and which may contain in solution as much as 0.005% sulfur, is passed to the lower portion of hydrogenator 2 via line 4. Simultaneously, $H_2$ is supplied to reactor 2 through line 6 in proportions at least sufficient to convert the aldehyde product into the corresponding alcohol. The catalyst within reactor 2 comprises molybdenum sulfide supported on an active carbon carrier prepared as detailed below, the proportion of molybdenum sulfide to the carrier being about 1 to 10%. Hydrogenator 2 may be operated at pressures of about 2500 to 4500 p. s. i. g., and at temperatures from about 400–600° F., a liquid feed rate of from 0.25–2 v./v./hr., and a hydrogen feed rate of from 5000–20,000 cu. ft./bbl. It is also beneficial to add to the hydrogenation zone up to 8–10% water.

The hydrogenation catalyst is preferably first prepared by impregnating 3/16" pellets of activated charcoal with ammonium molybdate, and drying in a steam oven at 250° F. The dried product is transferred to hydrogenator 2, and heated to 600° to 1000° F., in a stream of hydrogen admitted through line 8. Pressures of 200–3000 p. s. i. g., are maintained in 2, and the passage of gas is continued until at least part of the $MoO_3$ formed by the decomposition of the molybdate has been converted to the desired mixture of $MoO$ and $MoO_2$; the operation may also be controlled to produce substantially either of these oxides. Control of the extent of reduction is readily maintained by collecting and measuring the amount of water formed.

When the desired amount of reduction has been accomplished, the catalyst bed is cooled to about 200° to 400° F. and the catalyst sulfided, which may be carried out by passing gaseous H₂S or H₂S dissolved in an inert liquid, such as Varsol or virgin naphtha, through the bed until sulfiding is complete. These materials may also be passed into the bed through line 8, after the hydrogenation has been terminated.

After sulfiding, the catalyst is allowed to come to conditions, the excess sulfiding agent is purged, and a stream of inert hydrocarbon, such as Varsol, is passed through the bed for several hours. Thereafter, the aldehyde feed is cut in under operating conditions described above.

The products of the hydrogenation reaction are withdrawn overhead through line 10 and passed to the alcohol finishing plant for further processing in a manner known per se.

The process of the present invention and its results may be further illustrated by the following results obtained in a commercial operation wherein isooctyl alcohols were prepared from a heptene fraction. In run A, the catalyst was not reduced prior to sulfiding, while in run B, the catalyst was treated substantially in the manner described heretofore.

|  | A | B |
|---|---|---|
| Quantity of Off-test Alcohol Produced, Gals. (for 48 cu. ft. of catalyst change) | 20,000 | 10,000 |
| Ester Color of Initial Production | 1.05 | 0.57 |
| Sulfur Content of Initial Production, p. p. m. | 19 | 8 |
| Average Hydrogenation Cat. Temp., ° F. Required for Satisfactory Hydrogenation at Same Conditions (after 10,000 Bbl. Cumulative Feed to Unit) | 535 | 490 |
| Specification Grade Alcohol: |  |  |
| Sulfur, p. p. m. |  | 15 |
| Ester Color |  | 0.15 |

The above data clearly show that with the catalyst prepared in accordance with the present invention, the amount of off-test alcohol which required further processing was cut in half, being reduced from 20,000 to 10,000 gallons. Furthermore, the quality of the off-test alcohol initially prepared by the new process was considerably better than that initially prepared by the process employing the catalyst prepared by the former technique and thus requires considerably less reprocessing to make the alcohol suitable for plasticizing purposes.

It is of interest to note that the initially hydrogenated catalyst had a hydrogenation activity equal to that of the non-prehydrogenated catalyst at a considerably lower temperature level. This is a marked advantage. Particularly in the case of the sulfactive catalysts it has been found that at the higher temperatures necessary to get good activity, there is a marked tendency to overhydrogenation and conversion of the aldehyde directly to the hydrocarbon or olefin, due to dehydration of the alcohol initially formed. With the catalyst of the present invention, lower hydrogenation temperatures may be employed, thus minimizing overhydrogenation.

The process of the present invention may be modified in manners apparent to those skilled in the art. Thus, though a hydrogenation catalyst consisting of molybdenum sulfide on activated carbon has been described, the prereducing technique may be applied to sufide catalysts in general, particularly to those containing chromium, tungsten, cobalt and nickel, all of which may have sulfides existing in more than one valence state. Similarly, the oxides which are to be sulfided may be formed by other known means beside impregnation and heating to decompose the soluble salt. Also, the reduction need not be carried out to completion, but it is desirable that the metal component of the catalyst be reduced to a state of oxidation as low as in the sulfide form. Also, other sufiding agents such as $CS_2$ may be used.

The treatment of the molybdenum oxide with hydrogen prior to sulfiding can be employed with any molybdena preparation. For example, a catalyst comprising approximately equimolar quantities of molybdenum oxide, zinc oxide and magnesium oxide was tested in autoclave operations after (1) sulfiding without the hydrogen pretreatment and (2) sulfiding following hydrogen reduction at 850° F. Data from these operations are:

| Feed | $C_8$ Aldehydes from commercial plant + 5–6% water. | |
|---|---|---|
| Run No. | C. | D. |
| Catalyst | $MoO_3.ZnO.MgO$ | $MoO_3.ZnO.MgO$. |
| Catalyst Treatment | Reduced with $H_2$ at 850° F., Sulfided with $H_2S$ at 850° F. | Sulfided with $H_2S$ at 850° F. |
| Hours of Run | 4 | 4. |
| Temperature, ° F. | 375 | 375. |
| Pressure, p. s. i. g. | 2,700 | 2,700. |
| Product Carbonyl No. | 0.0 | 4.5. |
| Product Distribution: |  |  |
| Wt. Percent Hydrocarbon | 31.0 | 35.2. |
| Wt. Percent Intermediate | 2.5 | 3.2. |
| Wt. Percent Alcohol | 52.8 | 47.9. |
| Wt. Percent Bottoms | 13.7 | 13.7. |

To indicate that the amount of sulfur associated with the prereduced catalyst was substantially smaller than that associated with the same catalyst that was not given the prehydrogenation treatment, the following data are shown:

|  | Commercial Preparation Catalyst | |
|---|---|---|
|  | E—4½ Hrs. | F—8 Hrs. |
| Pretreatment | Nitrogen @ 300° F. | Hydrogen @ 850° F. |
| Activation | None \| $H_2S$ Sulfided | None \| $H_2S$ Sulfided. |
| Temp., ° F. | 850 | 850. |
| Hours | 5.5 | 6.5. |
| Analytical Data: |  |  |
| Mo as $MoO_3$ | 9.4 \| 9.1 | 10.1 \| 10.5. |
| Sulfur | 0.3 \| 7.8 | 0.3 \| 6.5. |
| Calculated Mo/S Ratio | 1/3.8 | 1/2.6. |

In run E, $MoO_3$ was treated with $H_2S$, whereas in run F the $MoO_3$ was first hydrogenated to a mixture of $MoO_2$ and $MoO$. The final catalyst in both cases, however, was essentially $MoS_2$, the difference in sulfur content reflecting and being a measure of the elementary sulfur formed by reduction of the hexavalent molybdenum in run E with $H_2S$.

What is claimed is:

1. In the production of alcohols by reacting olefins with CO and $H_2$ in a carbonylation stage at elevated temperaaldehyde product in the presence of a hydrogenation catalyst to form an aldehyde product, hydrogenating said aldehyde product in the presence of a hydrogenation catalyst under liquid phase hydrogenation conditions to form said alcohol product, the improvement which comprises carrying out said hydrogenation in the presence of a catalyst consisting essentially of a major proportion of preformed activated carbon pellets supporting a minor proportion of molybdenum sulfide, said catalyst being prepared by hydrogenating pellets comprising $MoO_3$ at a temperature of about 600° to 1000° F. and at a pressure of 200 to 3000 p. s. i. g. to convert a substantial portion of said molybdenum to a lower valence state, and thereafter sulfiding said hydrogenated product.

2. An improved process for hydrogenating oxo aldehydes which comprises passing an oxo alcohol product through a reaction zone containing a hydrogenation catalyst while maintaining hydrogenation pressures and temperatures in the range of about 2500 to 4500 p. s. i. g. and 400° to 600° F. respectively, said hydrogenation catalyst having been prepared by impregnating preformed activated char pellets with ammonia molybdate, heating said impregnated material to convert the molybdate to the oxide, hydrogenating said oxide at a temperature of about 600° to 1000° F. and a pressure of about 200 to 3000 p. s. i. g. for a period of time sufficient to convert a substantial portion of said oxide to a molybdenum oxide wherein said molybdenum has a valence lower than the hexavalent molybdenum, thereafter sulfiding said hydrogenated product with a sulfiding agent and recovering from said reaction zone an improved alcohol product containing substantially no sulfur contaminants.

3. A process in accordance with claim 2 wherein extraneous water is passed into said zone during said aldehyde hydrogenation reaction.

References Cited in the file of this patent
UNITED STATES PATENTS

| | | |
|---|---|---|
| 2,432,087 | Brown | Dec. 9, 1947 |
| 2,455,713 | Voorhies | Dec. 7, 1948 |
| 2,620,362 | Stiles | Dec. 2, 1952 |
| 2,671,763 | Winstrom et al. | Mar. 9, 1954 |
| 2,674,634 | Greensfelder et al. | Apr. 6, 1954 |
| 2,678,952 | Krebs | May 18, 1954 |
| 2,713,073 | Smith | July 12, 1955 |

FOREIGN PATENTS

| | | |
|---|---|---|
| 664,974 | Great Britain | Jan. 16, 1952 |